(12) United States Patent
Lim et al.

(10) Patent No.: US 10,019,371 B2
(45) Date of Patent: Jul. 10, 2018

(54) DATA CACHING USING LOCAL AND REMOTE MEMORY

(75) Inventors: Kevin T. Lim, La Honda, CA (US); Alvin AuYoung, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1107 days.

(21) Appl. No.: 13/458,477

(22) Filed: Apr. 27, 2012

(65) Prior Publication Data

US 2013/0290462 A1 Oct. 31, 2013

(51) Int. Cl.
*G06F 15/16* (2006.01)
*G06F 12/0873* (2016.01)
*H04L 29/08* (2006.01)
*G06F 12/0866* (2016.01)

(52) U.S. Cl.
CPC ...... *G06F 12/0873* (2013.01); *G06F 12/0866* (2013.01); *H04L 67/2842* (2013.01); *G06F 2212/284* (2013.01)

(58) Field of Classification Search
CPC .......... G06F 17/30902; G06F 12/0873; G06F 12/0866; G06F 2212/284; H04L 67/2842; H04L 29/08729; H04L 67/1095
USPC ................................................ 709/219, 213
See application file for complete search history.

(56) References Cited

U.S. PATENT DOCUMENTS

| | | | |
|---|---|---|---|
| 6,453,404 B1 * | 9/2002 | Bereznyi | G06F 12/023 711/119 |
| 7,401,131 B2 * | 7/2008 | Robertson et al. | 709/220 |
| 7,428,723 B2 * | 9/2008 | Greene et al. | 717/103 |
| 7,509,460 B2 | 3/2009 | Zeffer et al. | |
| 7,996,250 B2 | 8/2011 | Wiener et al. | |
| 8,082,400 B1 | 12/2011 | Chang et al. | |
| 8,086,765 B2 | 12/2011 | Turner et al. | |
| 2001/0047400 A1 * | 11/2001 | Coates et al. | 709/219 |
| 2007/0192825 A1 | 8/2007 | Frank et al. | |
| 2009/0274047 A1 | 11/2009 | Kruys et al. | |
| 2009/0276654 A1 * | 11/2009 | Butterworth | G06F 11/182 714/1 |
| 2010/0049635 A1 | 2/2010 | Delaney et al. | |
| 2010/0128605 A1 | 5/2010 | Chavan et al. | |
| 2010/0138485 A1 * | 6/2010 | Chow et al. | 709/203 |
| 2010/0332720 A1 | 12/2010 | Chang et al. | |
| 2011/0072204 A1 | 3/2011 | Chang et al. | |

(Continued)

OTHER PUBLICATIONS

Christian Tinnefeld, et al., "Cache-Conscious Data Placement in an In-Memory Key-Value Store," IDEAS11, Sep. 21-23, 2011, Lisbon, Portugal, pp. 134-142.

(Continued)

*Primary Examiner* — Kristie Shingles
(74) *Attorney, Agent, or Firm* — International IP Law Group, PLLC

(57) ABSTRACT

A system and method for retrieving cached data are disclosed herein. The system includes a cache server including a local memory and a table residing on the local memory, wherein the table is used to identify data objects corresponding to cached data. The system also includes the data objects residing on the local memory, wherein the data objects contain pointers to the cached data. The system further includes a remote memory communicatively coupled to the cache server through an Input-Output (I/O) connection, wherein the cached data resides on the remote memory.

20 Claims, 5 Drawing Sheets

(56) References Cited

U.S. PATENT DOCUMENTS

| | | |
|---|---|---|
| 2011/0113115 A1 | 5/2011 | Chang et al. |
| 2011/0185079 A1 | 7/2011 | Gershinsky et al. |
| 2011/0225342 A1 | 9/2011 | Sharma et al. |
| 2011/0261831 A1 | 10/2011 | Sharma et al. |
| 2012/0005556 A1 | 1/2012 | Chang et al. |
| 2012/0030406 A1 | 2/2012 | Chang et al. |
| 2012/0203825 A1* | 8/2012 | Choudhary et al. .......... 709/203 |
| 2013/0054869 A1* | 2/2013 | Tolia et al. .................. 711/102 |
| 2013/0159472 A1* | 6/2013 | Newton et al. .............. 709/219 |

OTHER PUBLICATIONS

Kevin Lim, et al., "Disaggregated Memory for Expansion and Sharing in Blade Servers," ISCA, Jun. 20-24, 2009, Austin, TX, pp. 1-12.

Kevin Te-Ming Lim, "Disaggregated Memory Architectures for Blade Servers," Doctural dissertaion in Computer Science and Engineering with the University of Michigan, 2010, 153 pp., Available at http://deepblue.lib.umich.edu/bitstream/2027.42/76007/1/ktlim_1.pdf, (last accessed on Aug. 6, 2012).

* cited by examiner

100

200

300

DATA CACHING USING LOCAL AND REMOTE MEMORY

BACKGROUND

In-memory key-value caches have become widely used to provide low-latency, high-throughput access to unstructured objects for the Internet-tier. For example, in many cases, a separate cache server (or set of such servers) that exists in front of the database tier may be used to cache database objects as they are read. This enables the cache server(s) to alleviate the load on the database tier. In order to provide low-latency operation, cached data may be maintained in a local volatile memory such as Dynamic Random Access Memory (DRAM), which provides for high-speed access to the cached data. However, the aggregate memory capacity of cache server(s) is often limited by various factors.

BRIEF DESCRIPTION OF THE DRAWINGS

Certain embodiments are described in the following detailed description and in reference to the drawings, in which.

DETAILED DESCRIPTION OF SPECIFIC EMBODIMENTS

Embodiments described herein relate to techniques for data caching that use both local and remote memory. In examples, cache operations, such as in-memory key-value cache operations, are performed on a cache server (from a set of such servers) within a memory architecture that includes both a local memory and a remote memory. In-memory key-value caching is a caching technique wherein the cached data and the information used to locate and access the cached data is stored in volatile memory, enabling fast access to the cached data. Furthermore, the cached data is stored as a data value that is located through the use of a key, which is provided to the cache server when a cache request is made. Key lookups can be performed through the use of a hash table residing on the cache server's local memory. The key lookup identifies a cache data object, which resides on the cache server's local memory and contains information relating to cache management as well as information that is used to identify the location of the cached data value residing on the remote memory. In this way, key lookups are processed in the local memory of the cache server, while the data values relating to the key lookups are stored on remote memory. This enables the utilization of the faster access times provided by the local memory, as well as the larger memory capacity of the remote memory. In some examples, a copy of the hash table and the cache data objects may also be maintained on the remote memory. In the case of a local failure, such as a failure of a compute node, the remote copy of the hash table and cache data objects can be used to enable fast recovery of the cache contents of the local memory.

Figure 1:
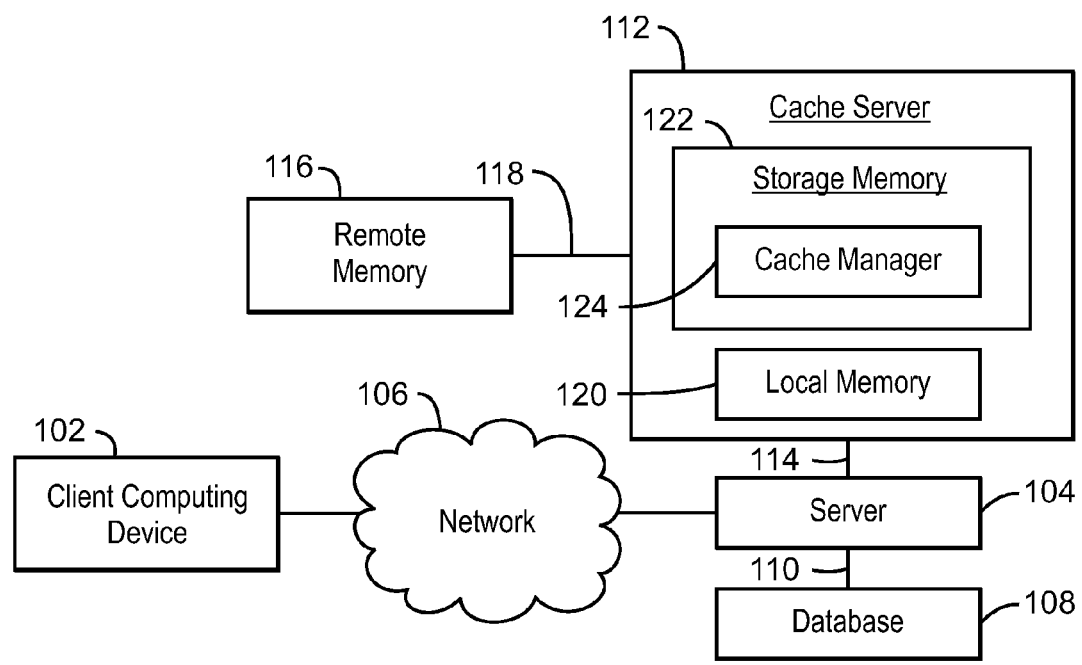
FIG. 1 is a block diagram of a computing system which may be used to implement a data caching procedure in accordance with embodiments.

FIG. 1 is a block diagram of a computing system 100 which may be used to implement a data caching procedure in accordance with embodiments. The computing system 100 may include a client computing device 102. The client computing device 102 may be any type of computing device that is capable of initiating a data request, such as a desktop computer, laptop computer, tablet computer, mobile computing device, or the like. Further, in some examples, the computing system 100 may include multiple client computing devices 102.

The client computing device 102 may be communicably coupled to a server 104 through a network 106. The server 104 may be configured to transfer data, such as images, media files, text documents, Web pages, and streaming data, among others, over the network 106. The server 104 may be any suitable type of server, including a Web server, an application server, a blade server, a cloud server, a cluster server, and the like. Further, the network 106 may be the Internet, a local-area network (LAN), a wide-area network (WAN), and the like. Moreover, the server 104 may be one member of a cluster of such servers placed similarly in the computing system 100.

The server 104 may also be communicatively coupled to a database 108, as indicated by arrow 110. The database 108 may be a relational database, a distributed database, a cloud database, an in-memory database, and the like. Further, the database 108 may be a relational database management system, such as MySQL or MySQL-cluster, that runs as a server providing access to a number of databases.

The computing system 100 also includes a cache server 112. The server 104 may be directly coupled to the cache server 112, or may be in communication with the cache server 112 via a network 114, such as a LAN. The cache server 112 may any type of server that provides key-value caching capabilities, such as a memcached server.

The cache server 112 may include local memory 120. As used herein, the term "local memory" refers to main memory that is physically situated on the same board as the processing unit of the cache server 112 and coupled to the processing unit through a high-speed memory bus, for example, an address bus and a data bus. The local memory 120 may be any type of volatile memory, such as random access memory (RAM), dynamic random access memory (DRAM), and the like. In addition, the cache server 112 can include or have access to storage memory 122 used to store various data and programs, including operating programs in accordance with embodiments described herein. The storage memory 122 may include non-volatile memory, such as read-only memory, flash memory, hard disks, and the like. The storage memory 122 within the cache server 112 may also include a cache manager 124 used to implement the data caching procedures described herein.

The computing system 100 also includes a remote memory 116 communicably coupled to the cache server 112. As used herein, the term "remote memory" refers to a byte-addressable volatile memory that is housed on a physically separate board from the processing unit of the cache server 112 and is accessible to a processing unit of the cache server 112 through a peripheral Input/Output (I/O) connection, such as (Peripheral Component Interconnect) PCI, PCI-eXtended (PCI-X), PCI-express (PCIe), HyperTransport (HT), and the like. The capacity of the remote memory 116 can be configured to be significantly larger than that of the local memory 120. In addition, such a large capacity can be provided at low costs by leveraging the pricing of the volatile memory, e.g., DRAM, and, in some cases, amortizing the cost of the remote memory blade over multiple compute servers.

The cache server 112 can use any suitable technique for maintaining software control over the placement of data. For example, the cache manager 124 can interface with an Application Programming Interface (API) that enables read and write commands to be issued to the remote memory 120. In examples, the cache manager 124 operates through a Non-Uniform Memory Access (NUMA)-aware operating system that maintains control over the placement of data.

In examples, the remote memory 116 may include one or more remote memory blades which may be disposed in a blade server. The remote memory blade may include arrays of memory modules assembled to provide high density and cost effectiveness, as well as to provide extra memory capacity that can be allocated on-demand to individual compute blade within the remote memory blade. In examples, the remote memory blade may include a protocol engine that interfaces with the remote memory blade enclosure's I/O backplane interconnect, as well as a custom memory-controller application-specific integrated circuit (ASIC), or a light-weight central processing unit (CPU). In addition, the remote memory blade may interface with one or more channels of dual in-line memory modules (DIMMs) connected via on-board repeater buffers or alternate fan-out techniques. The custom memory controller ASIC may handle requests from the cache server 112 to read and write memory, as well as manage capacity allocation and address mapping. In addition, optional memory-side accelerators may be added to support functions such as compression and encryption. Further, in various examples, although the remote memory blade includes custom hardware, the remote memory blade may not involve any changes to the design of the cache server 112, since it connects through standard I/O interfaces.

According to embodiments disclosed herein, the server 104 may be configured to receive a request for data from the client computing device 102 via the network 106. If the data has been previously cached by the server 104, the server 102 may send a request for the cached data to the cache server. The request for cached data may be referred to herein as a cache request. The cache request may include a key, which corresponds to the cached data that was requested and enables the cache server to identify the requested data. The server 104 may forward the cache request containing the key to the cache server 112.

In response to the cache request, the cache server 112 identifies the location of the cached data, which may reside on the remote memory 116. If the cached data resides on the remote memory 116, the cache server 112 retrieves the cached data from the remote memory 114 through the I/O connection 118. In some examples, a portion of the local memory may be reserved for some of the cached data. For example, data that is accessed more frequently may be cached to the local memory.

Once the cached data is obtained by the cache server 112, the cached data may be returned to the server 104. If the data requested by the client 102 has not previously been cached by the server 104 or if the previously cached data is no longer available, the server 104 may then obtain the data from the database 108. Once the server 104 obtains the data that was requested by the client computing device 102, the server 104 may return the data to the client computing device 102 via the network 106. Examples of techniques for processing a cache request in the cache server 112 may be better understood with reference to FIGS. 2 and 3.

Figure 2:
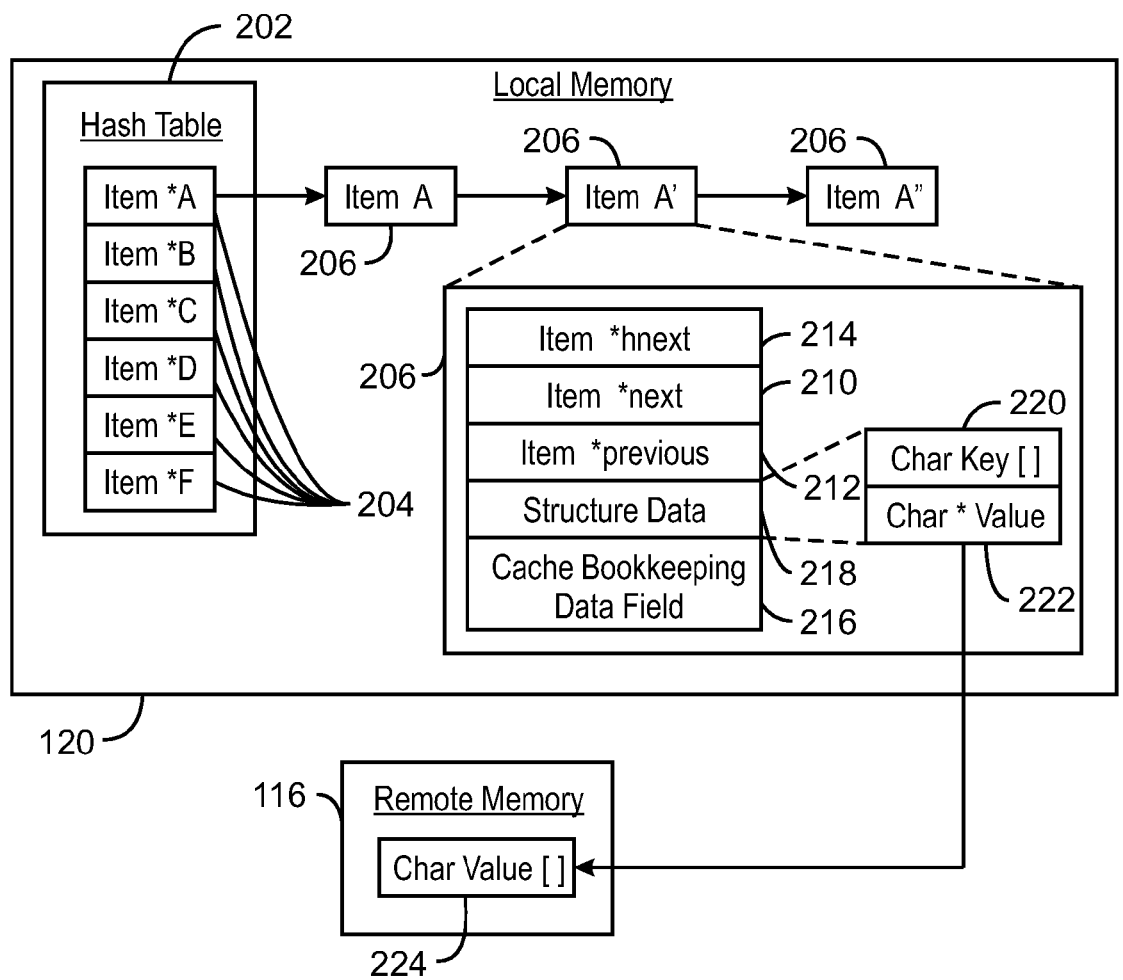
FIG. 2 is a block diagram of a data caching system that uses local memory and remote memory to support data storage and retrieval in accordance with embodiments.

FIG. 2 is a block diagram of a data caching system 200 that uses local memory 120 and remote memory 116 to support data storage and retrieval in accordance with embodiments. As described above, the local memory resides on the cache server 112. As shown in FIG. 2, the local memory 120 can include a hash table 202 used as a lookup table for locating cached data. Although the present techniques are described in relation to a hash table, it is appreciated that any suitable type of table may be used for the process of locating cached data. The cache request may include a key that corresponds to the particular data that is being requested by the cache server 112. The key may be hashed within the cache server using a hash algorithm to generate a hash value that is used as an index into the hash table 202. The particular hash table entry indicated by the hash value includes a pointer 204 to one or more items of cached data.

Information related to each item of cached data may be stored within an instance of data object class referred to herein as an "item." For the sake of simplicity, each instance of the item class may be referred to simply as an item 206. Each entry in the hash table 202 may include a pointer 204 to one or more items 206. For example, as shown in FIG. 2, the first hash table entry, referred to as "Item *A", includes a pointer 204 to multiple items 206, e.g., Item A, Item A' and Item A".

In various examples, each item 206 may include various data fields used to store information related to the item 206. In examples, one or more of the data fields contain information related to cache maintenance. For example, the item may include a data field 210 that includes a pointer to a next item, e.g., Item *next, as well as a data field 212 that includes a pointer to a previous item, e.g., Item *previous. The data fields 210 and 212 may be used to choose items to evict, or delete, from the cache. The item may also include a data field 214 that includes a pointer to the next item 206 that maps to the same hash table index, e.g., Item *hnext. The data field 214 may be used to resolve chaining for hash table collisions. In addition, the item 206 may include a cache bookkeeping data field 216, wherein the cache bookkeeping data field 216 may include information relating to, for example, item expiration times and item reference counts. The cache server 112 performs cache maintenance operations on the hash table 202 and the items 206 based, at least in part, on the information stored in the items 206.

The items 206 may include a data field referred to herein as a data structure field 218. The data structure field 218 can include the key 220 that is associated with the particular cache request, e.g., char Key[ ], and a character value pointer 222, e.g., char *Value. The character value pointer 222 may be used to identify the location of the cached data, referred to as character value 224, within the remote memory 116. For example, the character value pointer 222 may include a memory address or range of memory addresses corresponding to the location of the character value 224 within the remote memory 116.

Using the data structure described above, key lookups and other processes used for locating cache data can be performed in the local memory 120 of the cache server 112. When the correct item 206 is identified, the cached data can then be retrieved from the remote memory 116. This enables the data caching system 200 to utilize the faster access times of the local memory 120, as well as the large capacity of the remote memory 116. For example, upon receiving a request for cached data, the cache server 112 performs a key lookup to locate the cached data. For example, the key received from the server 104 may be hashed and used as an index to the hash table 202. The identified hash table entry contains a pointer to a first item 206, e.g. Item A. The cache server 112 then obtains the key 220 from the first item 206 and determines whether the key matches the key provided in the cache request. If the key 220 does not match, the cache server 112 identifies the next item 206, e.g., Item A', based on the data field 214 of the first Item 206, Item A. The process can be repeated until the last item 206 corresponding to the identified hash table entry 204 is reached or the matching key 220 is identified. When the matching key 220 is identified, the cache server 112 obtains the character value pointer 222 and retrieves the character value 224 from the remote memory. In this way, the multiple processing steps involved in locating the cached data may be performed more quickly in the local memory 120, while enabling the use of the higher capacity memory resources provided by the remote memory 116.

In examples, an additional amount of space within the local memory 120 may be set aside for cached data. For example, character values 224 which are often written to or modified, like counter objects, or character values 224 with short expiry times may be stored within the local memory 120. In such cases, the character value pointer 222 may point to a memory location for memory residing on the local memory 120.

Figure 3:
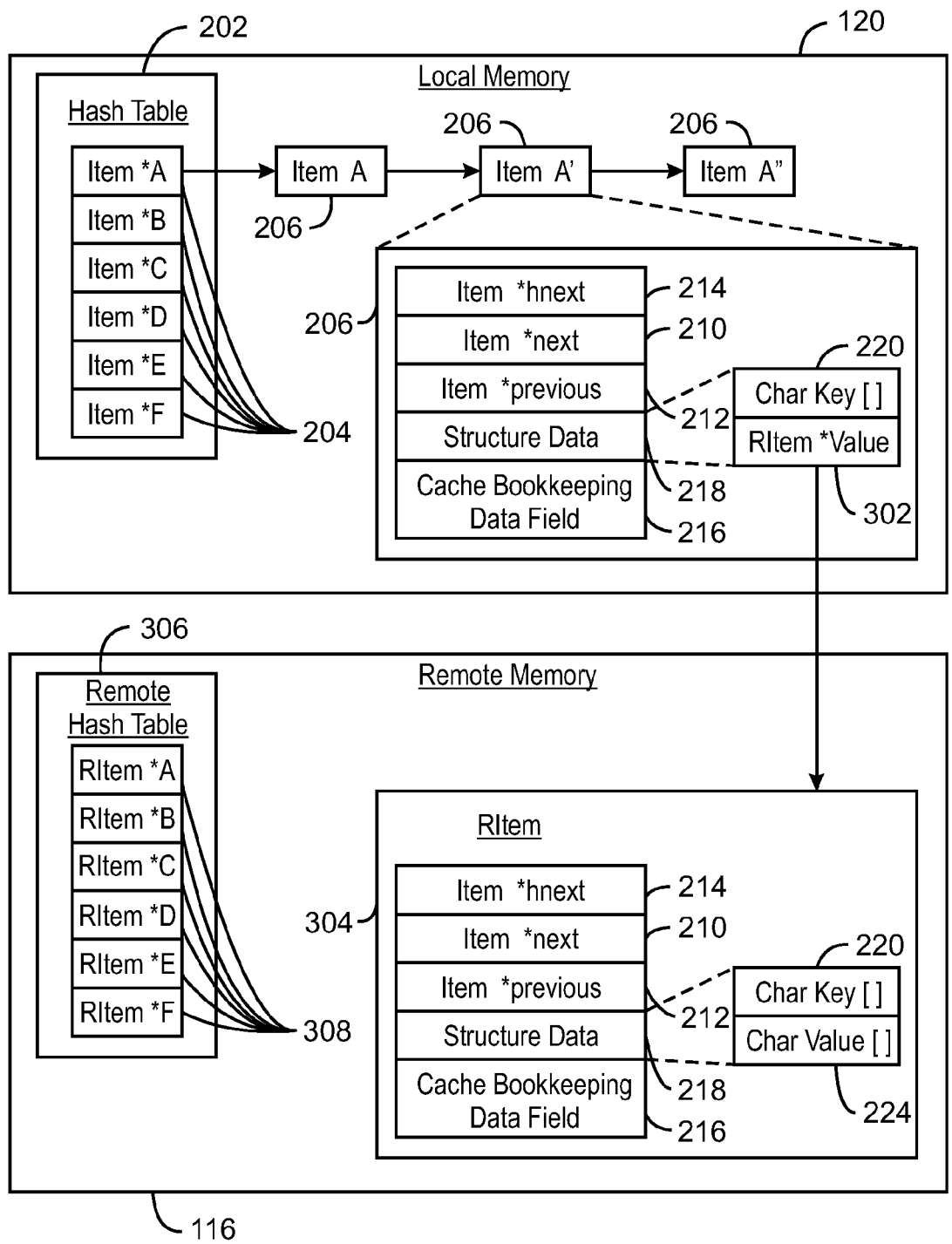
FIG. 3 is a block diagram of a data caching system that uses local memory and remote memory to support data storage and retrieval, as well as fast crash recovery, in accordance with embodiments.

FIG. 3 is a block diagram of a data caching system 300 that uses local memory 120 and remote memory 116 to support data storage and retrieval, as well as fast recovery after failure, in accordance with embodiments. The data caching system 300 operates in a similar manner to the data caching system 200 described above, and also includes additional features that allow for faster recovery in the event of a failure of the cache server 112.

The remote memory 116 may be in a separate failure domain than the local memory 120. Thus, while a crash related to software or misconfiguration issues may result in a reboot and, therefore, a loss of data for the local memory 120, the crash may not affect the remote memory 116. Therefore, the data caching system 300 may provide a mechanism to permit fast recovery of the local memory 120 using the remote memory 116. As described above in relation to FIG. 2, the local memory 120 of the data caching system 300 includes a hash table 202 used to perform key value lookups, and items 206 that contain information related to the cached data. The process for locating the cached data in response to a cache request may be substantially as described in relation to FIG. 2. Additionally, the cached data is stored on the remote memory. However, rather than simply storing the character value 224, the remote memory includes a remote item 304. The item 206, residing on the local memory, includes a data field 302 that contains a pointer, e.g., RItem *Value, used to identify the location of the remote item 304 within the remote memory 116. Furthermore, although only one remote item 304 is shown in FIG. 3, it is appreciated that the remote memory 116 includes a corresponding remote item for each item stored to the local memory 120.

In examples, each remote item 304 may be a data object that is an instance of the "item" class. Thus, the remote item 304 can include the same data fields as described above in relation to the items 206 residing on the local memory 120, with the exception that the remote item 304 contains the actual character value 224, rather than the pointer 302 to the remote item 304. In other examples, the remote item 304 may be of a separate data object class that includes only some of the data fields of the "item" class, including the character value 224. It is appreciated that in examples wherein the remote item 304 is of the same class as the item 206, some of the data fields of the remote item 304 may be left unpopulated depending on the design considerations of a particular implementation. For example, faster recovery of the full caching data structure residing on the local memory 120 may be obtained if all of the data fields of the item 206 are replicated to the corresponding remote data item 304, while more efficient usage of the remote memory 116 may be realized by a limited replication of the data fields. In some examples, each remote item includes only the character value 224. In some examples, each remote item includes the character value 224 as well as the pointer *hnext corresponding to data field 214, which is used to handle hash collisions.

The remote memory 116 may also include a remote hash table 306, which is an independent copy of the hash table 202 residing on the local memory 120. Thus, when the pointers 204 to the items 206 are allocated, deleted, or updated by the local memory 120, the associated pointers 308 are allocated, deleted, or updated on the remote memory 116. Changes to the remote hash table 306 can be performed either synchronously or asynchronously with changes to the hash table 202 residing on the local memory 120. In examples where changes to the remote hash table 306 are performed asynchronously, any invalidation of an item 206 may cause an immediate update to the remote hash table 306.

Together, the remote hash table 306 and the remote items 304 provide a backup for the hash table 202 and items 206 residing on the local memory 120. If a failure of the cache server 112 occurs, the cache server 112 can enter a recovery mode upon reboot. During the recovery mode, the contents of the remote hash table 306 can be copied to the hash table 202 residing on the local memory 120 and the remote items 304 can be copied to the local memory 120. In this way, the some or all of the cached data can be quickly recovered from the remote memory 116.

Figure 4:
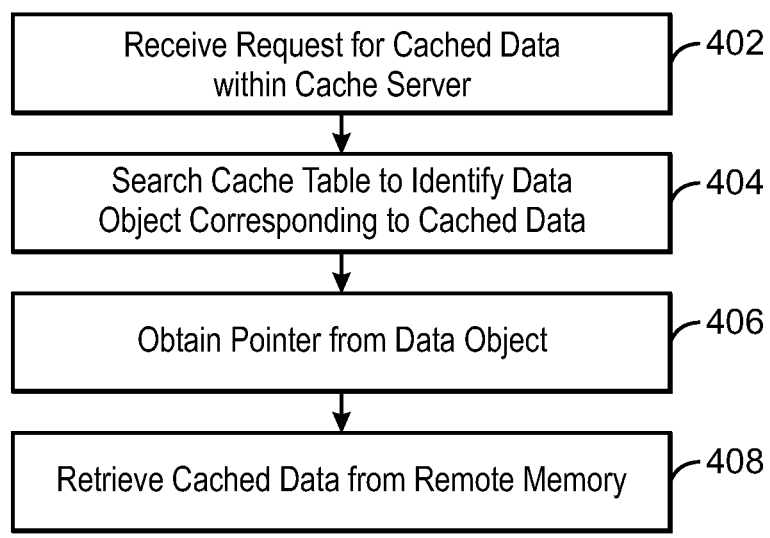
FIG. 4 is a process flow diagram showing a method for retrieving cached data in accordance with embodiments.

FIG. 4 is a process flow diagram showing a method 400 for retrieving cached data in accordance with embodiments. The method 400 may utilize both local and remote memory to locate and retrieve the cached data. In embodiments, the method 400 is implemented by the cache server 112 in accordance with the data caching system 200 or the data caching system 300 discussed with respected to FIGS. 2 and 3, respectively. In addition, the specific computing devices that are used to perform the method 400 may be those discussed above with respect to the computing system 100 of FIG. 1.

The method 400 begins at block 402, wherein a request for cached data is received within a cache server. The cache server may include an in-memory key-value cache. The cache request may be sent to the cache server from another server via a network. For example, the cache request may be initiated by a Web server that is communicably coupled to the cache server, wherein the Web server initiates the cache request in response to receiving a data request from a client computing device. The cache request may include a key relating to the data.

At block 404, a hash table is searched to identify a data object corresponding to the cached data. The hash table and the data object may reside on local memory of the cache server and a hash table lookup may be performed within the local memory. The key that is included within the request for the cached data may be hashed within the cache server using a hash algorithm. The hashed version of the key may then be used as an index to the hash table. The hash table entry corresponding to the key provides a pointer to a cache data object, for example, item 206, residing on the local memory. In examples, where hash collisions can occur, a key comparison may be performed to determine whether the cache data object is the correct data object that matches the key.

At block 406, a pointer is obtained from the data object, wherein the pointer identifies a location of the cached data residing on remote memory. In some examples, the pointer is a memory address corresponding to a location in the remote memory where the cached data value resides. In some examples, the pointer identifies the location of a remote data item on the remote memory.

At block 408, the cache server retrieves the cached data from the remote memory using the pointer that was identified within the local memory. The cached data may then be sent to the server that initiated the cache request.

FIG. 4 is not intended to indicate that the steps of method 400 are to be executed in any particular order. In addition, any number of the steps of method 400 may be deleted, and any number of additional steps may be added, depending on the specific application. For example, some data may be cached on the local memory of the cache server based, at least in part, on how frequently the data is accessed. This may allow for the fast retrieval of frequently-used data from the local memory without accessing the remote memory.

In addition, if it is determined that the data object associated with the desired cached data is not located within the hash table, the method 400 may include sending a failure response from the cache server to the server that initiated the request for the cache data, e.g., the Web server. Then, the Web server may query a database to obtain the desired data from the database.

Figure 5:
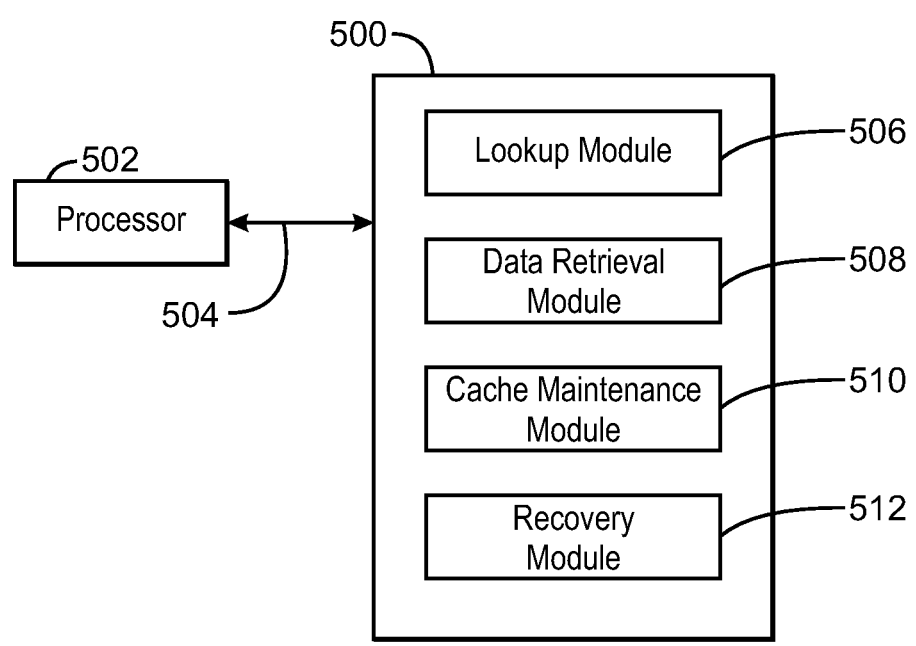
FIG. 5 is a block diagram of a tangible, non-transitory, computer-readable medium 500 that stores code configured to instruct a processor to perform data caching in accordance with embodiments.

FIG. 5 is a block diagram of a tangible, non-transitory, computer-readable medium 500 that stores code configured to instruct a processor to perform data caching in accordance with embodiments. The computer-readable medium 500 may be accessed by a processor 502 over a computer bus 504. Furthermore, the computer-readable medium 500 may include code to direct the processor 502 to perform the cache management techniques described herein.

The various software components discussed herein may be stored on the tangible, non-transitory, computer-readable medium 500, as indicated in FIG. 5. For example, a key lookup module 506 may be configured to receive a key that is included within a cache request and locate a data object, e.g., an item, corresponding to a cached data value. For example, as discussed above, the key lookup module 506 may retrieve a pointer from a hash table, identify one or more items corresponding to the pointer, and perform a key comparison to identify the correct item. Once the item corresponding to the key is identified, a data retrieval module 508 may be configured to retrieve a cached data value that is identified by a pointer stored to the item. The data retrieval module 508 may obtain the cached data value from a remote memory, such as remote memory 116.

The non-transitory, computer-readable medium 500 may also include a cache maintenance module 510 that updates the cache information stored to the local memory 120 and remote memory 116. For example, the cache maintenance module 510 can add or remove items in response to specific requests from server, such as the Web server 104 (FIG. 1). The cache maintenance module 510 can add or remove items based on the frequency with which the data is accessed. In examples, the cache maintenance operations are processed in the local memory 120 of the cache server 112. The cache maintenance module 510 can also be configured to maintain a copy of the hash table 202 and the local data objects, e.g., items 206, in the remote memory 116. A recovery module 512 may be configured to recover some or all of the cache information after a failure, for example, after a successful reboot of the cache server 104 or one or more compute nodes of the cache server 112. The recovery module repopulates the hash table 202 residing on local memory 120 from the remote hash table 306 residing the remote memory 116. The recovery module can also re-create the items 206 residing on the local memory 120 from the remote items 304 residing on the remote memory 116.

It is to be understood that FIG. 5 is not intended to indicate that all of the software components discussed above are to be included within the computer-readable medium 500 in every implementation. Further, any number of additional software components not shown in FIG. 5 may be included within the computer-readable medium 500, depending on the design considerations of a specific implementation.

While the present techniques may be susceptible to various modifications and alternative forms, the exemplary embodiments discussed above have been shown only by way of example. It is to be understood that the technique is not intended to be limited to the particular embodiments disclosed herein. Indeed, the present techniques include all alternatives, modifications, and equivalents falling within the true spirit and scope of the appended claims. For example, while examples provided herein are discussed with respect to a disaggregated memory system, they may also be applied to any type of tiered memory system including disjoint memory regions, as long as the lower tiers provide sufficient performance for the in-memory key-value caches, i.e., as long as the lower tiers are significantly faster than disks. Examples of other potential tiered memory solutions that may be used include a hybrid DRAM/Memristor main memory, or a hybrid embedded DRAM/DRAM main memory.

What is claimed is:

1. A system, comprising:
    a cache server comprising:
        a local memory;
        a table residing on the local memory, wherein the table is used to identify data objects corresponding to cached data; and
        the data objects residing on the local memory, wherein the data objects contain pointers to the cached data; and
    a remote memory communicatively coupled to the cache server through an Input-Output (I/O) connection and in a separate failure domain than the local memory, wherein the cached data resides on the remote memory while key lookups to the cached data are processed in the local memory to utilize faster access times in the local memory and larger capacity of the remote memory and permit fast recovery of the local memory using the remote memory.

2. The system of claim 1, wherein the remote memory comprises a backup copy of the table and a backup copy of the data objects.

3. The system of claim 2, wherein the backup copy of the table and the backup copy of the data objects are both updated synchronously with the table and the data objects residing on the local memory of the cache server.

4. The system of claim 2, wherein the backup copy of the table and the backup copy of the data objects are both updated asynchronously with the table and the data objects residing on the local memory of the cache server.

5. The system of claim 1, wherein the remote memory is a byte-addressable, volatile memory included in a memory blade coupled to the cache server.

6. The system of claim 5, wherein the memory blade is coupled to the cache server through a back plane of an enclosure of the cache server.

7. The system of claim 1, comprising a Web server communicatively coupled to the cache server and configured to send cache requests to the cache server.

8. The system of claim 1, wherein a second cached data is saved on the local memory of the cache server based, at least in part, on how frequently the second cached data is accessed.

9. The system of claim 1, wherein the cache server is an in-memory key-value cache.

10. A method for retrieving cached data, comprising:
receiving, within a cache server, a request for cached data;
searching a table to identify a data object corresponding to the cached data, wherein the table and the data object reside on a local memory of the cache server;
obtaining a pointer from the data object, wherein the pointer identifies a location of the cached data residing on a remote memory communicatively coupled to the cache server and in a separate failure domain than the local memory; and
retrieving the cached data from the remote memory,
wherein key lookups to the cached data are processed in the local memory to utilize faster access times in the local memory and larger capacity of the remote memory and permit fast recovery of the local memory using the remote memory.

11. The method of claim 10, comprising storing a copy of the table and a copy of the data object on the remote memory.

12. The method of claim 11, wherein:
storing the copy of the table on the remote memory comprises synchronously updating the copy of the table each time a change is made to the table on the local memory of the cache server; and
storing the copy of the data object on the remote memory comprises allocating the copy of the data object on the remote memory when the data object is allocated on the local memory of the cache server.

13. The method of claim 11, comprising, in response to a failure of the cache server:
repopulating the table using the copy of the table stored on the remote memory; and
recreating the data object using the copy of the data object stored on the remote memory.

14. The method of claim 10, wherein the remote memory is a byte-addressable, volatile memory included in a memory blade communicatively coupled to the cache server through an Input-Output (I/O) connection.

15. The method of claim 10, comprising performing a maintenance operation on the data object based on information stored in the data object.

16. The method of claim 10, wherein the request for cached data is received from a Web server.

17. A tangible, non-transitory, computer-readable medium that stores instructions that direct a processor to:
receive, within a cache server, a request for cached data;
search a table to identify a data object corresponding to the cached data, wherein the table and the data object reside on a local memory of the cache server;
obtain a pointer from the data object, wherein the pointer identifies a location of the cached data residing on a remote memory communicatively coupled to the cache server and in a separate failure domain than the local memory; and
retrieve the cached data from the remote memory,
wherein key lookups to the cached data are processed in the local memory to utilize faster access times in local memory and larger capacity of the remote memory and permit fast recovery of the local memory using the remote memory.

18. The tangible, non-transitory, computer-readable medium of claim 17, wherein the instructions direct the processor to store a copy of the table and a copy of the data object on the remote memory.

19. The tangible, non-transitory, computer-readable medium of claim 18, wherein:
storing the copy of the table on the remote memory comprises synchronously updating the copy of the table each time a change is made to the table on the local memory of the cache server; and
storing the copy of the data object on the remote memory comprises allocating the copy of the data object on the remote memory when the data object is allocated on the local memory of the cache server.

20. The tangible, non-transitory, computer-readable medium of claim 18, wherein the instructions direct the processor to, in response to a failure of the cache server:
repopulate the table using the copy of the table stored on the remote memory; and
recreate the data object using the copy of the data object stored on the remote memory.

* * * * *